US009565343B2

(12) United States Patent
Matsumoto et al.

(10) Patent No.: US 9,565,343 B2
(45) Date of Patent: Feb. 7, 2017

(54) CAMERA SHOE EXTENSION

(71) Applicant: TEAC Corporation, Tokyo (JP)

(72) Inventors: Atsushi Matsumoto, Saitama (JP); Norio Matsuura, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 14/189,803

(22) Filed: Feb. 25, 2014

(65) Prior Publication Data
US 2015/0062418 A1    Mar. 5, 2015

(30) Foreign Application Priority Data

Sep. 3, 2013  (JP) ................................. 2013-005095

(51) Int. Cl.
H04N 5/225 (2006.01)
G03B 17/56 (2006.01)
G03B 15/05 (2006.01)
G03B 31/00 (2006.01)

(52) U.S. Cl.
CPC ............ *H04N 5/2252* (2013.01); *G03B 15/05* (2013.01); *G03B 17/566* (2013.01); *G03B 31/00* (2013.01); *G03B 2215/056* (2013.01)

(58) Field of Classification Search
None
See application file for complete search history.

(56) References Cited

U.S. PATENT DOCUMENTS 4,045,808 A     8/1977 King
4,272,177 A     6/1981 Ottenheimer
2008/0204591 A1*  8/2008 Takashima et al. .......... 348/375
2011/0279661 A1  11/2011 Pan Ho
2012/0013791 A1   1/2012 Zhan
2012/0106946 A1   5/2012 Johnson
2012/0256072 A1* 10/2012 Russell .................. H04R 1/026
                                                248/339

FOREIGN PATENT DOCUMENTS

GB    2301641 A      12/1996
JP    2-51494 U      4/1990
JP    7-3750 Y2      1/1995
JP    2010-039430 A  2/2010

OTHER PUBLICATIONS

Extended European Search Report, dated Feb. 19, 2015, for corresponding European Application No. 14154670.5-1560, 6 pages.
Korean Notification of Reason for Refusal dated Sep. 7, 2015, for corresponding KR Application No. 10-2014-0021827, 9 pages.

* cited by examiner

*Primary Examiner* — Mark T Monk
(74) *Attorney, Agent, or Firm* — Seed IP Law Group LLP

(57) ABSTRACT

A microphone assembly includes a microphone unit and an attachment unit. The attachment unit includes a camera shoe attachment section. A camera shoe extension includes a support arm and a camera shoe attachment section attached to a rear end of the support arm. The support arm is curved into a circular arc shape such that the front end thereof is located higher than the rear end thereof. The camera shoe attachment section of the attachment unit is mounted on a shoe formed on the front end of the support arm. The camera shoe attachment section of the camera shoe extension is mounted on a camera shoe of a digital camera.

10 Claims, 12 Drawing Sheets

CAMERA SHOE EXTENSION

BACKGROUND

Technical Field

The present invention relates to a camera shoe extension which is detachably attached to a camera shoe of a digital camera and holds an accessory.

Description of the Related Art

A camera shoe is formed on a camera body of a digital camera such that an accessory such as a flash device and a microphone assembly can be detachably attached to the camera body. For example, according to Japanese unexamined utility model application publication No. 2-051494 and Japanese examined utility model application publication No. 7-003750, it is described that a microphone assembly is detachably attached to a camera shoe.

Since a camera and a lens device are provided with various motors, operating noise of the motors, noise of moving members driven by the motors, and the like are generated during image capturing. In order to surely prevent generation of such operating noise and the like, it is necessary to keep an adequate distance between the microphone assembly and the camera body. However, according to Japanese unexamined utility model application publication No. 2-051494 and Japanese examined utility model application publication No. 7-003750, the microphone assembly is attached to the camera shoe formed on the camera body, and therefore it becomes impossible to keep an adequate distance between the microphone assembly and the camera body.

Moreover, it is known that the flash device causes a so-called red-eye effect in which pupils of a subject appear red in the case where the flash device is located near a taking lens. In order to prevent such a red-eye effect, it is only necessary to keep the flash device away from the camera body. However, the flash device is mounted on the camera shoe of the camera body, and therefore it becomes impossible to keep an adequate distance between the flash device and the camera body.

BRIEF SUMMARY

In view of the above, an object of the present invention is to provide a camera shoe extension capable of being attached to a camera body while keeping an adequate distance between an accessory and the camera body.

In order to achieve the above and other objects, a camera shoe extension of the present invention includes a support arm, a camera shoe attachment section, and a shoe. The support arm has a first end and a second end. The camera shoe attachment section is formed on a lower surface of the first end of the support arm. The camera shoe attachment section is detachably attached to a camera shoe of a digital camera. The shoe is formed on an upper surface of the second end of the support arm. The shoe holds an accessory such that the accessory is detachable from the shoe.

Further, the support arm is preferably curved into a circular arc shape such that the second end is located higher than the first end.

Furthermore, the camera shoe attachment section preferably includes a leg portion to be inserted into the camera shoe, and a clamp ring for clamping the camera shoe between the clamp ring and the leg portion.

Further, the support arm preferably includes a first arm on which the camera shoe attachment section is formed, and a second arm on which the shoe is formed. The second arm is slidably attached to the first arm.

Furthermore, preferably, the camera shoe attachment section is rotatably attached to the support arm.

Further, the support arm preferably includes a first arm on which the leg portion and the clamp ring are formed, and a second arm on which the shoe is formed. The second arm is slidably attached to the first arm.

Furthermore, preferably, the leg portion and the clamp ring are rotatably attached to the support arm.

According to the present invention, one end of the support arm is mounted on the camera shoe of the digital camera, and the other end of the support arm holds the accessory such that the accessory is detachable therefrom. Therefore, it is possible to attach the accessory to the camera body while keeping an adequate distance between the accessory and the camera body. Accordingly, in the case where the microphone assembly is attached to the support arm, it is possible to perform recording with high-quality sound without picking up the operating noise of the motors and the like by the microphone assembly during the image capturing. Additionally, in the case where the flash device is attached to the support arm, it is possible to prevent occurrence of the red-eye effect.

BRIEF DESCRIPTION OF THE SEVERAL VIEWS OF THE DRAWINGS

The above objects and advantages of the present invention will become easily understood by one of ordinary skill in the art when the following detailed description of the preferred embodiments would be read in connection with the accompanying drawings, wherein.

DETAILED DESCRIPTION

Figure 1:
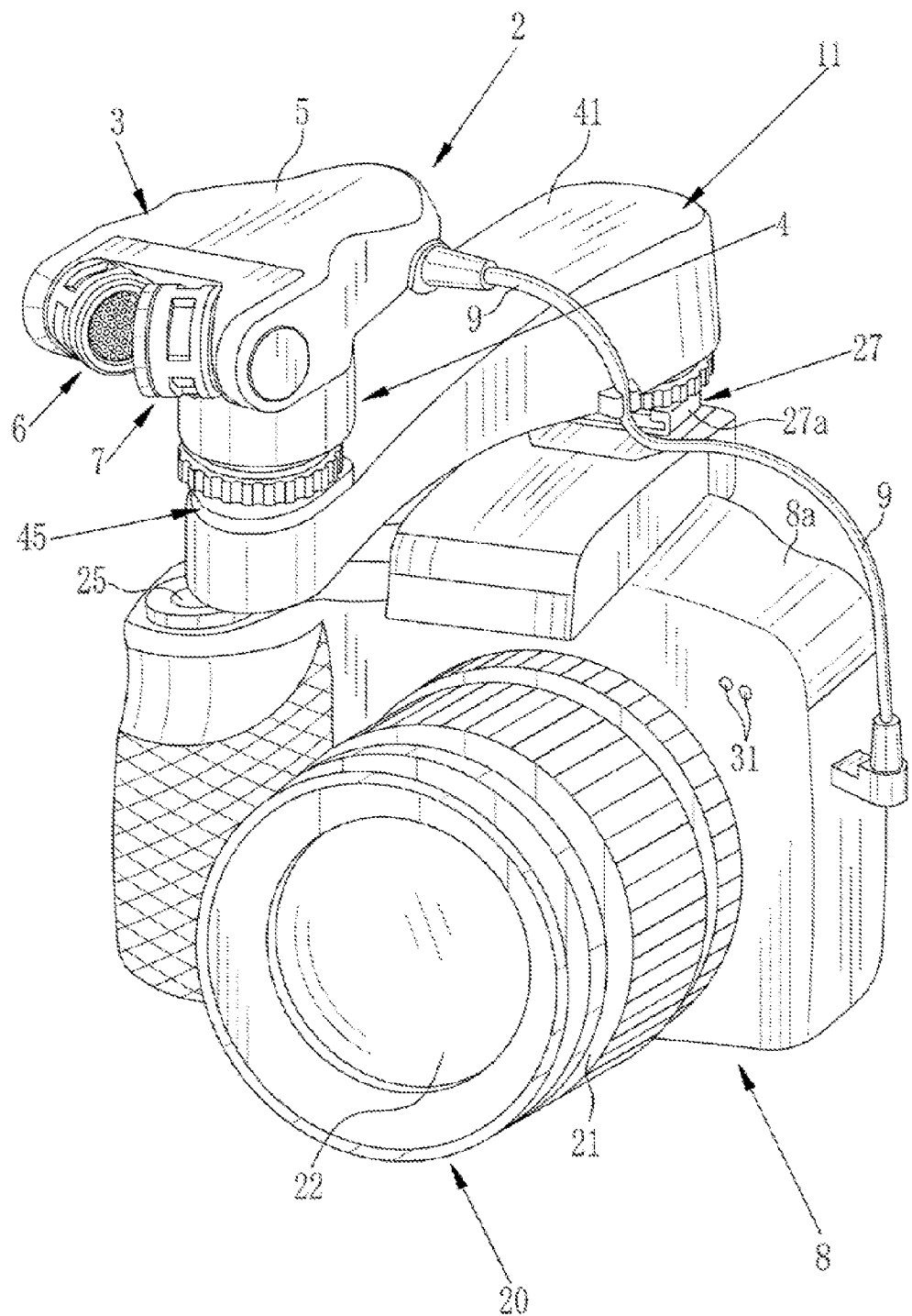
FIG. 1 is a perspective view of a digital camera to which a microphone assembly is attached through a camera shoe extension according to an embodiment of the present invention.
Figure 2:
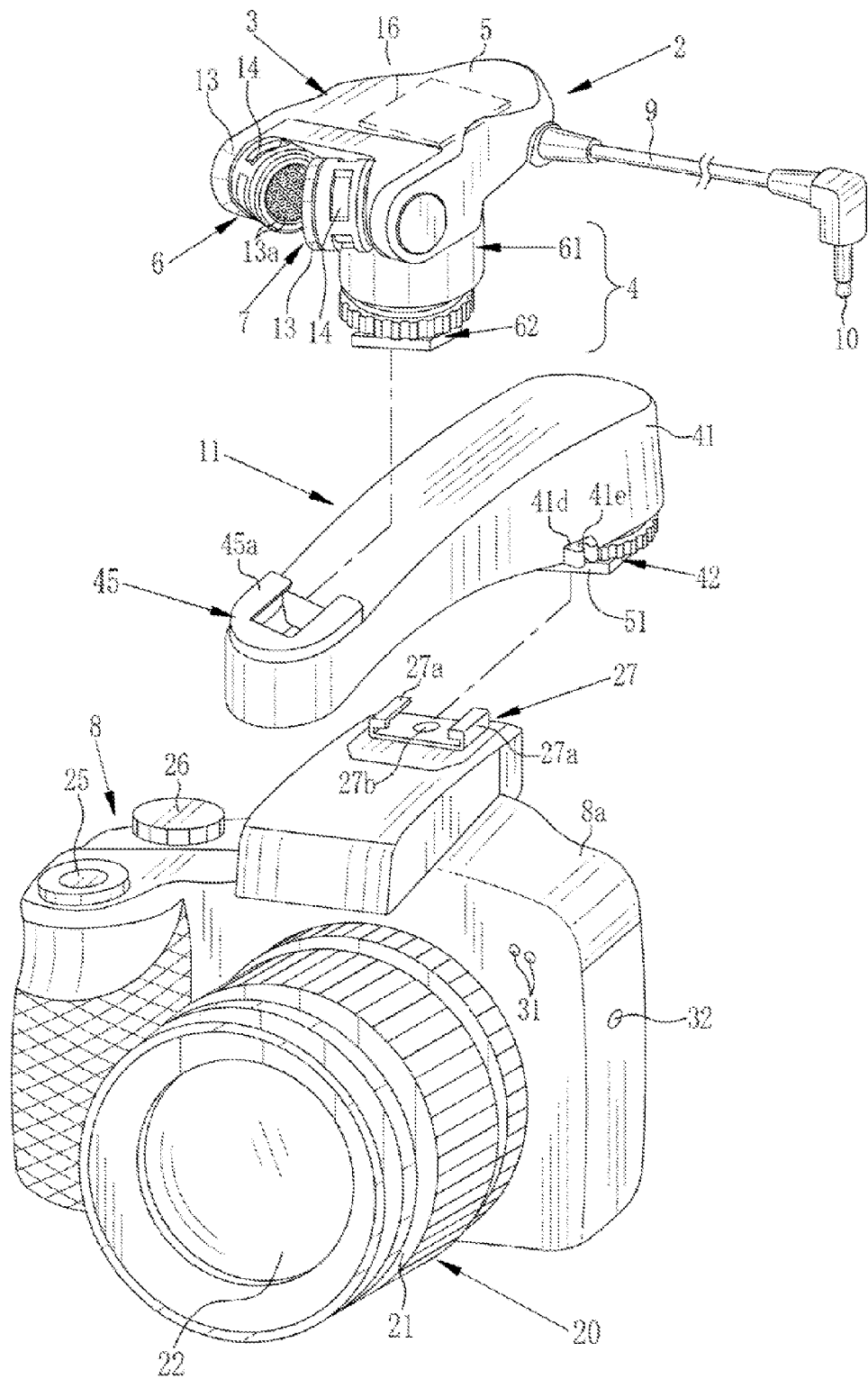
FIG. 2 is a perspective view of the digital camera from which the camera shoe extension is detached.

As shown in FIGS. 1 and 2, a microphone assembly 2 includes a microphone unit 3 and an attachment unit 4. The microphone unit 3 includes a casing 5, and a left microphone 6 and a right microphone 7 respectively attached to the casing 5. The microphone assembly 2 is detachably attached to a digital camera 8 through a camera shoe extension 11. The casing 5 is provided with a connection cord 9 for transmitting a sound signal from the microphones 6 and 7 to the digital camera 8. A pin jack 10 is fixed to a tip of the connection cord 9. Although a single-lens reflex camera is described in this embodiment, a compact camera may be used. Further, it may be sufficient to use one microphone.

Each of the left and right microphones 6 and 7 consists of a cylindrical transducer chamber 13 containing a transducer 14 for converting sound into a sound signal (electrical signal). The transducer chamber 13 has plural sound collection holes 13a for transmitting ambient sound to the transducers 14. A control board 16 for controlling driving of the microphone unit 3 is disposed in the casing 5. The transducer 14 of each of the left and right microphones 6 and 7 and the connection cord 9 are connected to the control board 16.

The digital camera 8 includes a camera body 8a and a lens device 20 detachably attached to a front side of the camera body 8a. As is well known, the camera body 8a includes an imaging device containing an image sensor, an image processing device, an image/sound recording device, and the like. The lens device 20 includes a lens barrel 21 and a zoom lens system 22 disposed in the lens barrel 21. A zoom motor for zooming operation, a focus motor for focusing operation, and a shake correction motor for shake correction are housed in the lens barrel 21. Note that some of these motors may be disposed in the camera body 8a.

A release button 25, a mode setting dial 26, the camera shoe 27, and the like are arranged on an upper side of the camera body 8a. The mode setting dial 26 is used to select one of a still image capturing mode, a moving image capturing mode, a moving image/sound capturing mode, a reproducing mode for reproducing the image and the sound stored in a detachable memory card, and the like. The camera shoe 27 has a pair of bent sections 27a for holding a leg portion 51 of the camera shoe extension 11, and a contact point 27b for transmitting a flash trigger signal while a flash device (not shown) is mounted on the camera shoe 27.

A plurality of sound collection holes 31 are formed on the front side of the camera body 8a. A simple built-in microphone is disposed behind the sound collection holes 31. The built-in microphone is used to record the sound at the time of capturing a moving image, or is used to record only the sound. However, the built-in microphone picks up noise caused by vibration thereof upon receiving vibration of the motors, and therefore it becomes impossible to perform recording with high-quality sound.

A connector 32 is provided to a lateral side of the camera body 8a. The pin jack 10 of the connection cord 9 is inserted into the connector 32. The sound signal from the microphone assembly 2 is transmitted through the connection cord 9 to the image/sound recording device in the camera body 8a. Note that an external recording device may be connected to the connector 32 such that the pin jack 10 is inserted into an input terminal of the external recording device and thus connected to the connector 32. In this case, the sound signal from the microphone assembly 2 is transmitted through the connection cord 9 to the external recording device. Further, it is of course possible to transmit the sound signal from the microphone assembly 2 through the external recording device to the image/sound recording device in the camera body 8a.

The microphone assembly 2 is detachably attached to and held by the camera shoe extension 11. The camera shoe extension 11 consists of a support arm 41 and a camera shoe attachment section 42 formed at a rear end of the support arm 41. The camera shoe attachment section 42 is attached to the camera shoe 27 of the digital camera 8. The support arm 41 is curved into a circular arc shape such that a front end thereof is located higher than the rear end thereof which is attached to the camera shoe 27.

Figure 3:
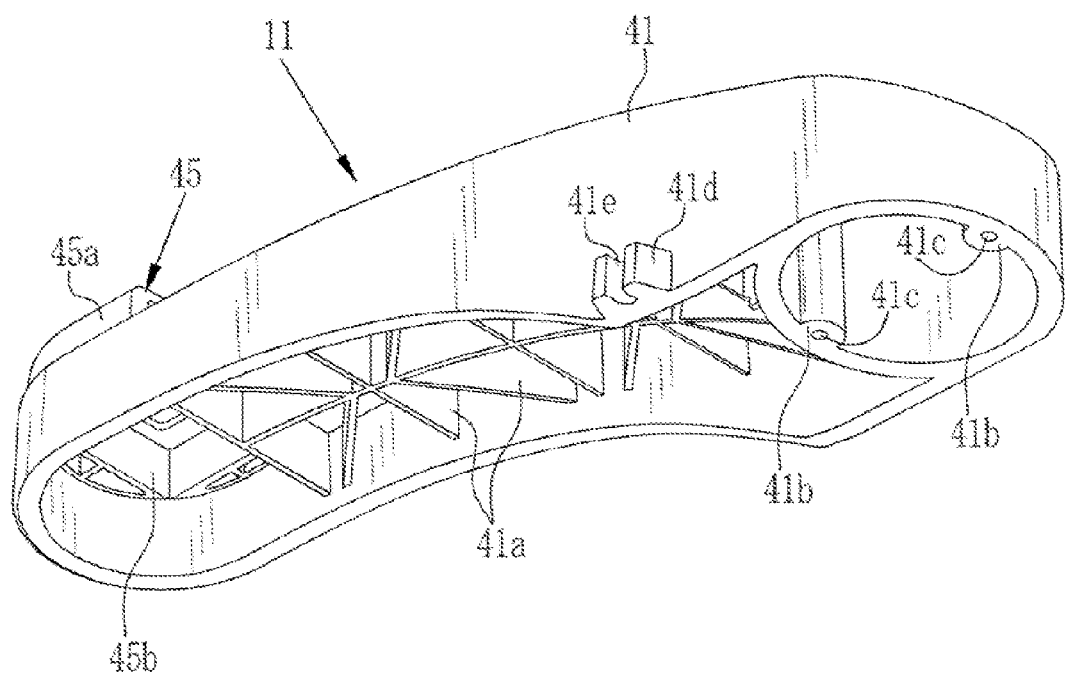
FIG. 3 is a perspective view of the camera shoe extension.
Figure 4:
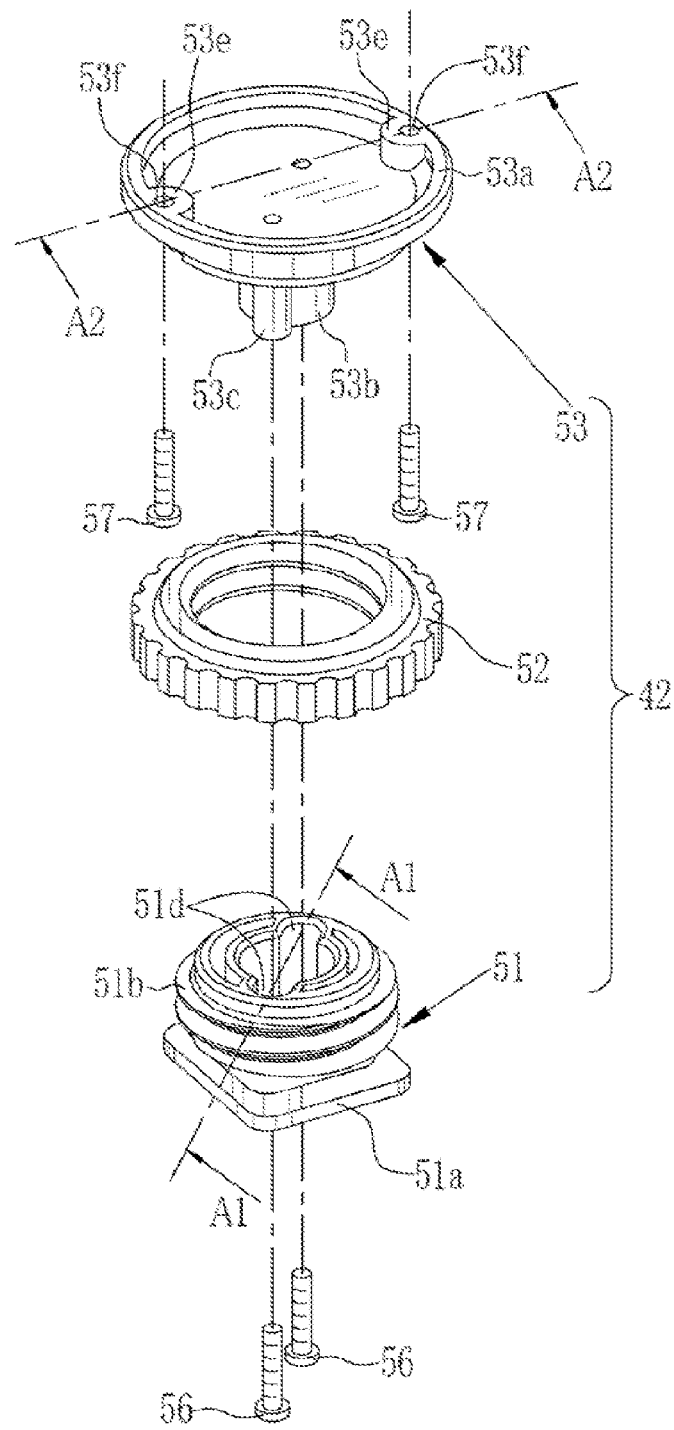
FIG. 4 is a perspective view of an exploded camera shoe attachment section.

As shown in FIGS. 2 and 3, an inside portion of the support arm 41 except its outer circumferential portion is formed into a convex shape. The inside portion of the support arm 41 includes a plurality of ribs 41a formed to be continuous with the outer circumferential portion so as to increase the strength of the support arm 41. Two attachment bosses 41b are formed on the rear end of the support arm 41 at a pitch of 180°. Each of the attachment bosses 41b has a screw hole 41c. Further, a projection 41d is formed on a right lateral surface of the support arm 41. The projection 41d has a cutout 41e into which the connection cord 9 is fit.

The front end of the support arm 41 is provided with a shoe 45 to which a camera shoe attachment section 62 of the attachment unit 4 is attached. The shoe 45 consists of a hook portion 45a and a receiving portion 45b which is formed under the hook portion 45a and receives the camera shoe attachment section 62.

As shown in FIGS. 4 to 7, the camera shoe attachment section 42 consists of the leg portion 51 to be mounted on the camera shoe 27, a clamp ring 52 for clamping the camera shoe 27 between the clamp ring 52 and the leg portion 51, and an attachment base 53 attached to the leg portion 51 and the support arm 41.

The leg portion 51 consists of a plate portion 51a to be inserted into the bent sections 27a of the camera shoe 27, and a cylindrical portion 51b having a male thread formed on the upper outer circumference thereof. Two screw insertion holes 51c are formed in the plate portion 51a at a pitch of 180°. Two insertion holes 51d communicated with the screw insertion holes 51c on a one-by-one basis are formed in the cylindrical portion 51b.

A female screw into which the male screw of the cylindrical portion 51b is threaded is formed on an inner circumferential surface of the clamp ring 52. Additionally, knurling is applied on the whole outer circumferential surface of the clamp ring 52, so as to be caught by a finger of a user at the time of rotating the clamp ring 52.

The attachment base 53 consists of a base body 53a, a cylindrical section 53b protruding downward from the center of the base body 53a so as to be inserted into the cylindrical portion 51b, and two attachment bosses 53c formed on an outer circumference of the cylindrical section 53b so as to be inserted into the insertion holes 51d on a one-by-one basis. Each of the two attachment bosses 53c has a screw hole 53d.

The base body 53a includes two bosses 53e formed at a pitch of 180°. Each of the bosses 53e has a screw insertion hole 53f. A recess portion 53g into which the front end of the cylindrical portion 51b is inserted is formed on the lower surface of the base body 53a. The cylindrical section 53b is inserted into the cylindrical portion 51b, and each of the attachment bosses 53c is inserted into the corresponding insertion hole 51d. In this state, a screw 56 is screwed to the screw hole 53d of the attachment boss 53c through the screw insertion hole 51c of the plate portion 51a on a one-by-one basis, and thus the leg portion 51 is fixed to the attachment base 53. Further, the screw 57 is screwed to the screw hole 41c of the support arm 41 through the screw insertion hole 53f on a one-by-one basis, and thus the attachment base 53 is fixed to the support arm 41.

Figure 5:
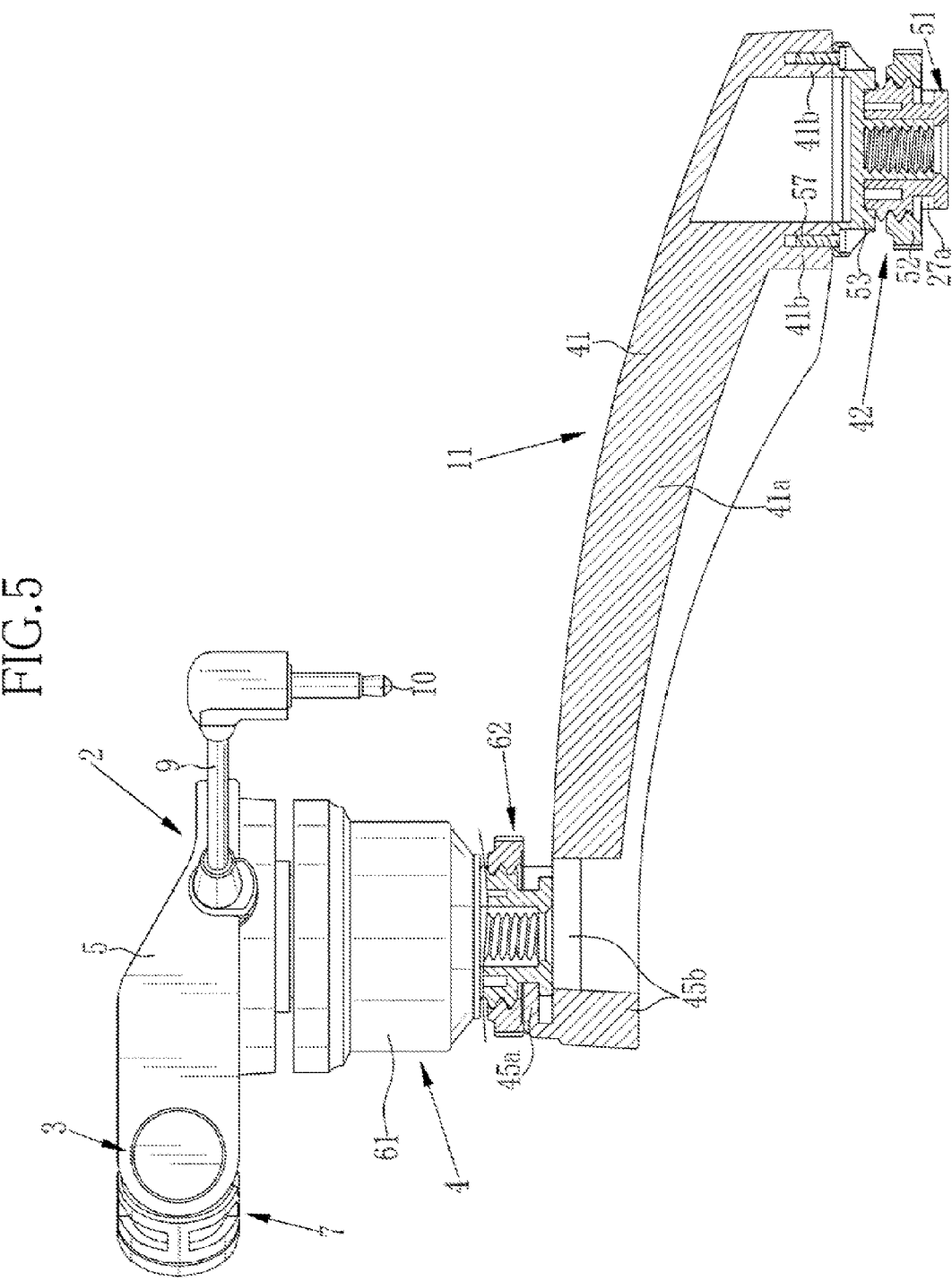
FIG. 5 is a cross-sectional view illustrating the microphone assembly and the camera shoe extension.
Figure 6:
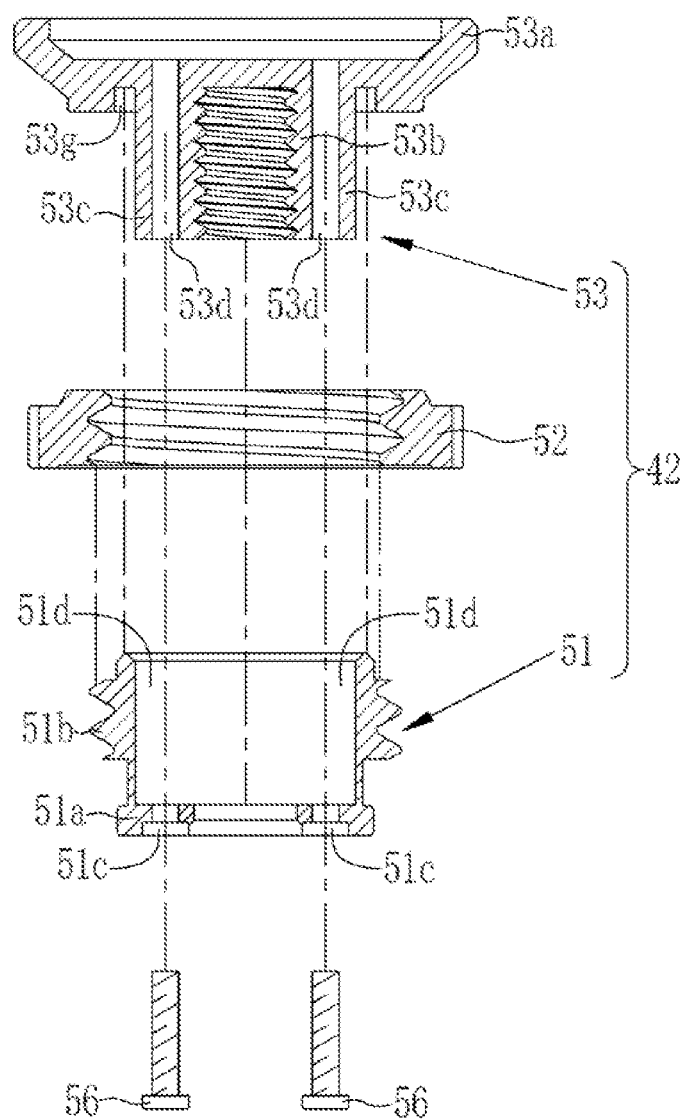
FIG. 6 is a cross-sectional view of the exploded camera shoe attachment section taken along lines A1-A1 of FIG. 4.
Figure 7:
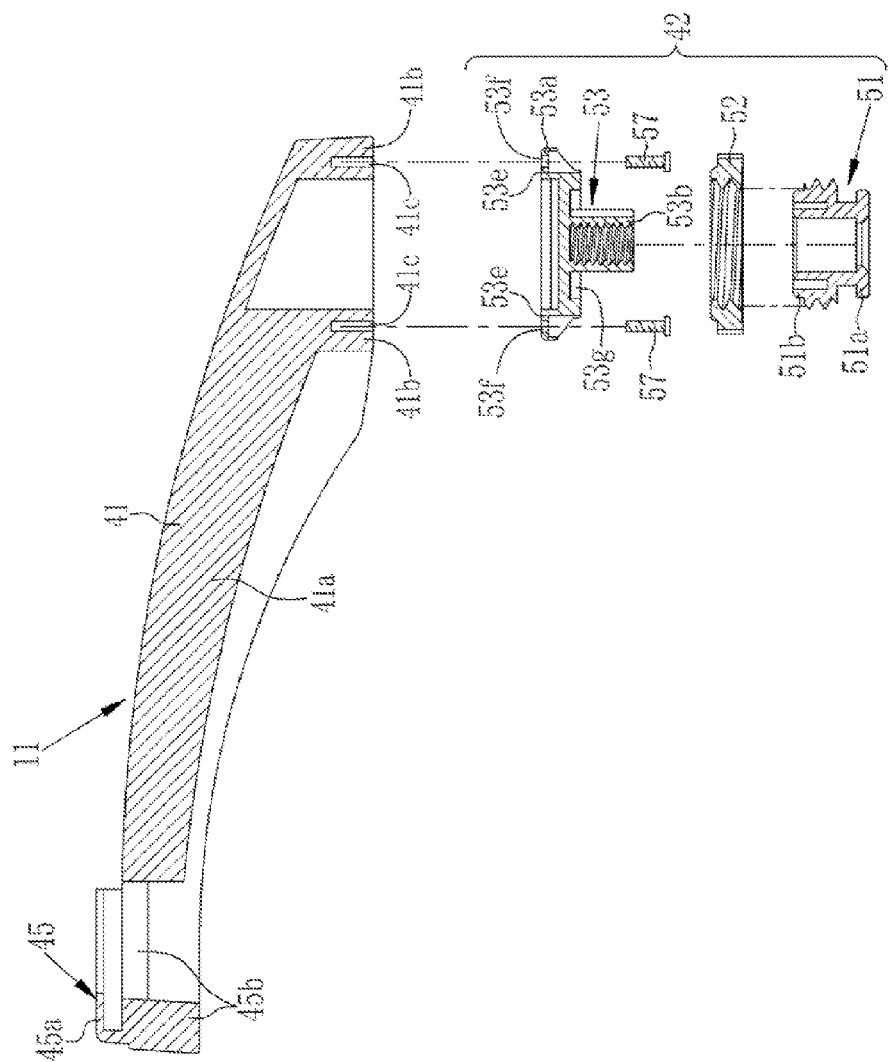
FIG. 7 is a cross-sectional view illustrating a support arm and the exploded camera shoe attachment section taken along lines A2-A2 of FIG. 4.

As shown in FIG. 5, the microphone unit 3 is detachably attached to and held by the camera shoe extension 11 through the attachment unit 4. The attachment unit 4 includes a damper housing section 61 disposed under the casing 5, and a camera shoe attachment section 62 disposed under the damper housing section 61. The camera shoe attachment section 62 has the same structure as that of the camera shoe attachment section 42, and is detachably attached to the shoe 45 of the support arm 41.

The damper housing section 61 has a cylindrical section which houses two dampers as elastic members made of rubber, for example. The elasticity of the dampers prevents transmission of vibration to the microphone unit 3.

Next, the operation of the camera shoe extension 11 is described. In order to capture a moving image with sound by using the digital camera 8, at first, the camera shoe extension 11 is attached to the camera shoe 27. At this time, the plate portion 51a of the camera shoe attachment section 42 is inserted into the camera shoe 27, and then the clamp ring 52 is rotated to be moved downward, such that the bent sections 27a are clamped between the clamp ring 52 and the plate portion 51a. In the same manner, the microphone assembly 2 is attached to the shoe 45 of the camera shoe extension 11. At this time, the hook portion 45a of the shoe 45 is clamped between the clamp ring of the camera shoe attachment section 62 and the plate portion thereof.

After the microphone assembly 2 is attached to the camera shoe extension 11, the pin jack 10 of the connection cord 9 is connected to the connector 32 of the digital camera 8. While the microphone unit 3 is connected to the digital camera 8, the built-in microphone in the digital camera 8 remains in an off-state, and the recording is performed using the microphone unit 3. The microphone unit 3 is driven by electricity supplied from the digital camera 8. Note that the microphone unit 3 may be driven by an internal battery.

The mode setting dial 26 is operated to switch the mode of the digital camera 8 to the moving image/sound capturing mode, and then the release button 25 is pressed once to start the capturing of a moving image. Upon starting of the moving image capturing, the imaging light having passed through the lens device 20 is incident on the image sensor in the camera body 8a. As is well known, a moving image is captured by the image sensor, and the image data is recorded on the memory card.

Concurrently with the moving image capturing, the sound in the scene enters the microphones 6 and 7, and is converted into a sound signal by the transducer 14 of each of the microphones 6 and 7. The sound signal is subjected to digital conversion by the control board 16, and then transmitted to the camera body 8a through the connection cord 9. The sound data is associated with the image data of the moving image, and recorded on the memory card or the recording medium of the external recording device.

While the moving image with sound is captured, the zooming operation, the focusing operation, and the shake correction are continuously performed. At this time, plural motors operate, and therefore operating noise and vibration thereof are caused. Since the microphone assembly 2 is attached to the camera body 8a through the camera shoe extension 11, the microphones 6 and 7 are kept away from the camera body 8a. Thereby, the microphones 6 and 7 do not pick up the operating noise. As a result, it is possible to perform recording with high-quality sound.

The vibration of the motors tends to be transmitted to the microphone assembly 2 through the camera body 8a and the camera shoe extension 11. However, the vibration of the motors is absorbed by the elastic dampers housed in the damper housing section 61.

After the capturing of the moving image with sound is completed, or in the case where the digital camera 8 is intended to be kept somewhere, the clamp ring 52 is loosened to remove the leg portion 51 from the camera shoe 27, and thereby the camera shoe extension 11 can be removed from the digital camera 8. Similarly, the microphone assembly 2 can be removed from the camera shoe extension 11.

Figure 8:
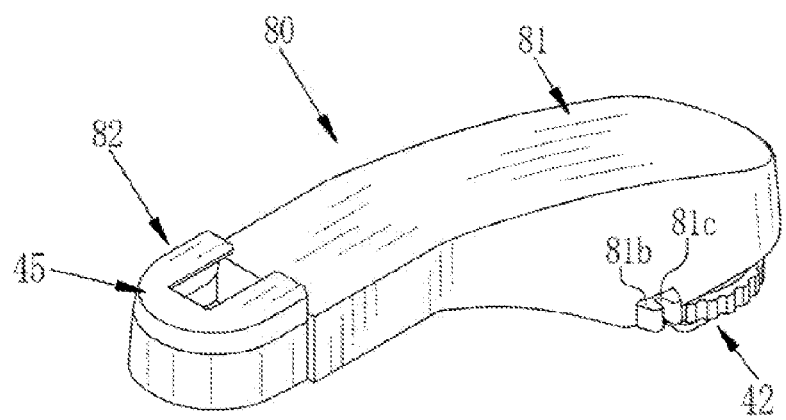
FIG. 8 is a perspective view of a support arm composed of a first arm and a second arm according to another embodiment of the present invention.
Figure 9:
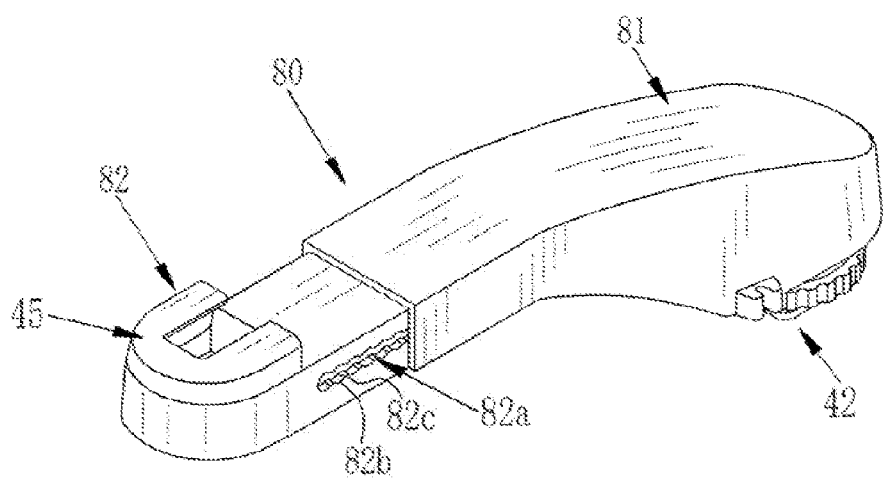
FIG. 9 is a perspective view of the support arm of the embodiment shown in FIG. 8 in which the second arm is slid forward.
Figure 10:
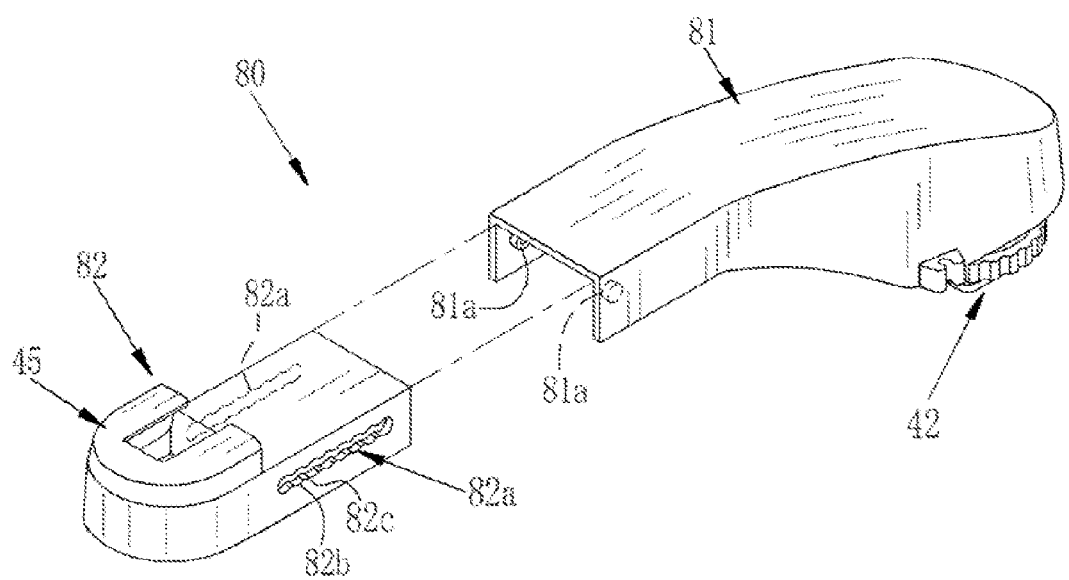
FIG. 10 is a perspective view of the support arm of the embodiment shown in FIG. 8 in which the first and second arms are exploded.

Note that, as shown in FIGS. 8 to 10, a support arm 80 including a first arm 81 and a second arm 82 attached to the first arm 81 so as to be slidable in a front-back direction may be used. A projection 81b is formed on a right lateral surface of the first arm 81. The projection 81b has a cutout 81c into which the connection cord 9 is fit. A cylindrical protrusion 81a is formed on both inner lateral surfaces of the first arm 81. A slide hole 82a as a long hole into which the protrusion 81a is inserted is formed on both lateral surfaces of the second arm 82. A plurality of circular arc portions 82b each having approximately the same diameter as that of the protrusion 81a and a plurality of small-diameter portions 82c each having a diameter smaller than that of the protrusion 81a are alternately arranged to constitute the slide hole 82a. When each of the protrusions 81a is inserted into one of the circular arc portions 82b, the second arm 82 is fixed. Note that, as in the case of the above embodiment, the shoe 45 is formed on the second arm 82, and the camera attachment section 42 is attached to the first arm 81.

Upon sliding of the fixed second arm 82 with strong force, each of the cylindrical protrusions 81a is deformed and gets out of the circular arc portion 82b. Upon sliding of the second arm 82 to a position where each of the protrusions 81a is inserted into the next circular arc portion 82b, each of the protrusions 81a is inserted into the next circular arc portion 82b, and the second arm 82 is fixed.

Figure 11:
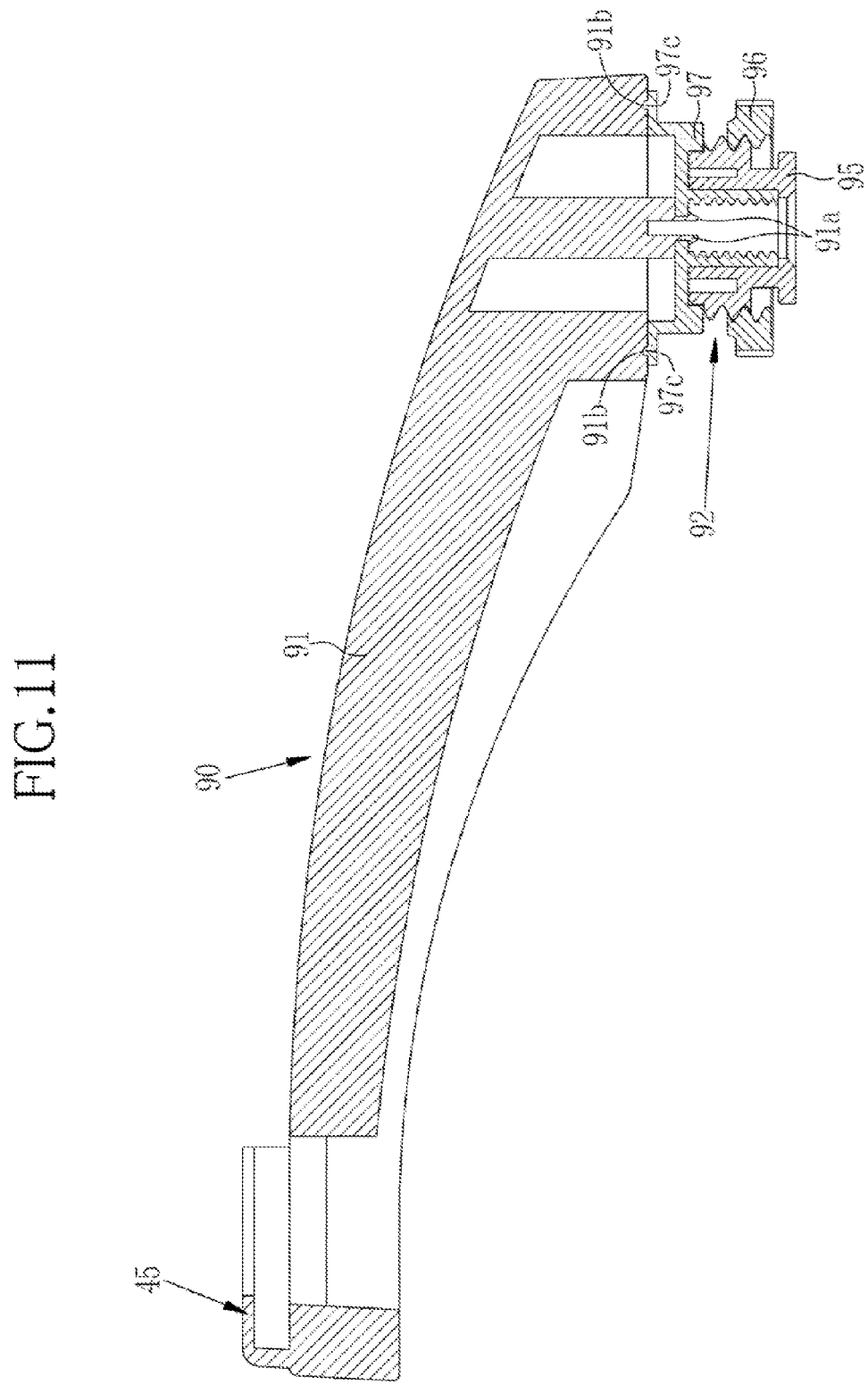
FIG. 11 is a cross-sectional view of a camera shoe extension in which a support arm is rotatably supported by a camera shoe attachment section according to yet another embodiment of the present invention.
Figure 12:
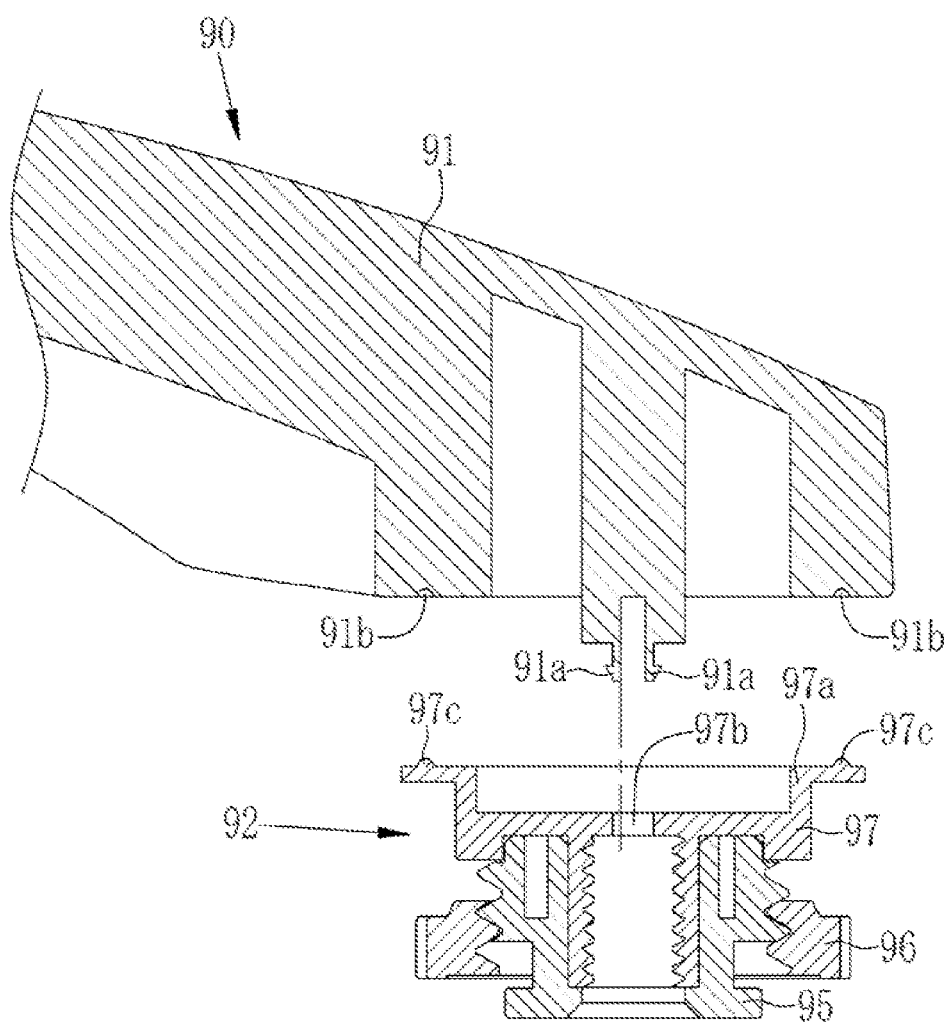
FIG. 12 is an exploded cross-sectional view of the camera shoe extension of the embodiment shown in FIG. 11.
Figure 13:
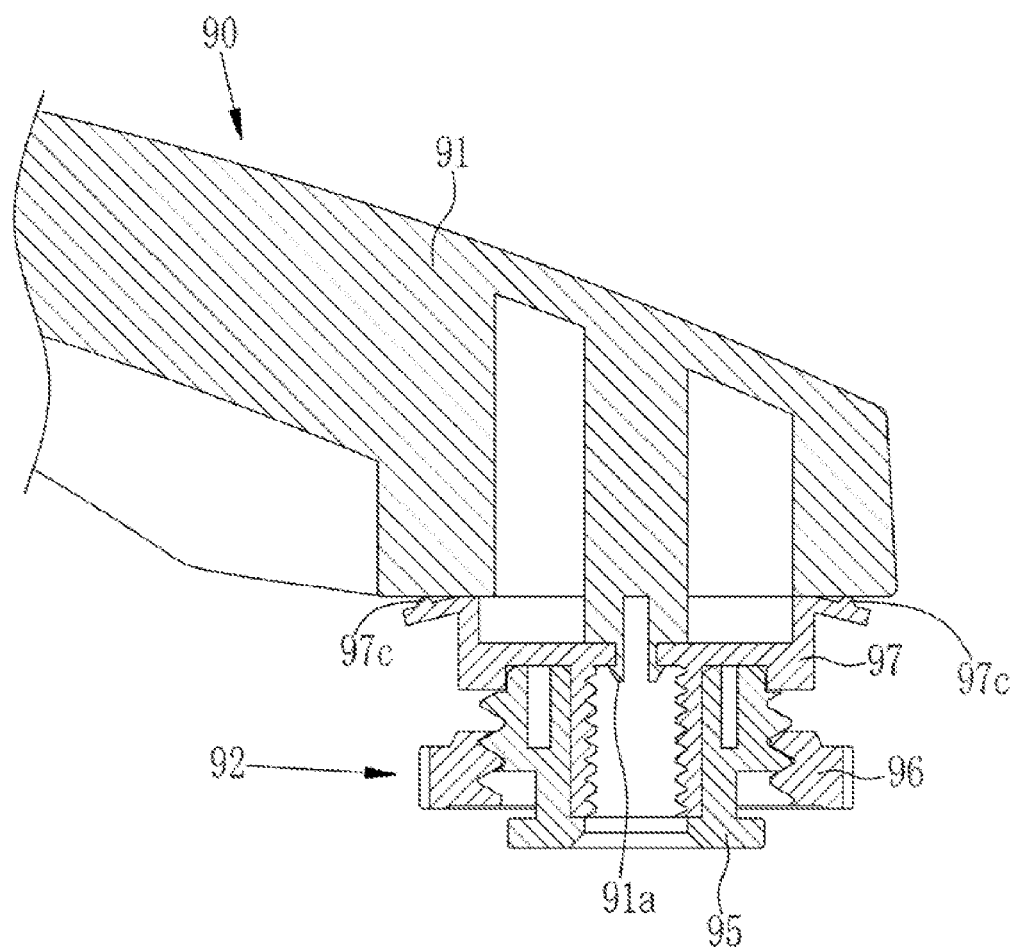
FIG. 13 is a cross-sectional view of the camera shoe extension of the embodiment shown in FIG. 11 in which fixation of the support arm to the camera shoe attachment section is released.

Further, as shown in FIGS. 11 to 13, a camera shoe extension 90 composed of a support arm 91 and a camera shoe attachment section 92 rotatably attached to the support arm 91 may be used. A rear end of the support arm 91 has two hook portions 91a and twelve click concave portions 91b formed at a pitch of 30°, for example. The camera shoe attachment section 92 consists of a leg portion 95, a clamp ring 96, and an attachment base 97, as in the case of the above embodiment. A base body 97a of the attachment base 97 has an attachment hole 97b into which the hook portions 91a are inserted, and two click convex portions 97c formed at a pitch of 180°. When the hook portions 91a are inserted into the attachment hole 97b, the support arm 91 is rotatably attached to the camera shoe attachment section 92. When the click convex portions 97c are fitted into the click concave portions 91b on a one-by-one basis, the support arm 91 is fixed.

Upon rotating of the fixed support arm 91 with strong force, the portion of the base body 97a on which each of the click convex portions 97c is formed is deformed, and each of the click convex portions 97c gets out of the click concave portion 91b, such that the fixation of the support arm 91 is canceled, as shown in FIG. 13. Upon rotating of the support arm 91 to a position where each of the click convex portions 97c faces the next click concave portion 91b, each of the click convex portions 97c is fit into the next click concave portion 91b, and the support arm 91 is fixed.

Note that, in the same manner as that shown in FIGS. 11 to 13, the camera shoe attachment section of the microphone assembly may be rotatably supported by the support arm. At this time, the click convex portion is formed on the leg portion of the microphone assembly, and the click concave portion is formed on the hook portion of the support arm, such that the leg portion is rotatably supported by the hook portion. The space between the hook portion and the receiving portion, into which the leg portion is inserted, is slightly larger than the leg portion, such that the leg portion is rotatable.

Further, the structure in which the camera shoe attachment section of the microphone assembly is rotatably supported by the support arm may be adopted in the embodiment shown in FIGS. 8 to 10.

Furthermore, a flash device may be attached to the support arm of the camera shoe extension. In this case, a cord is caused to pass through the inside of the support arm, so as to transmit a flash trigger signal to the flash device.

Note that, although the camera shoe attachment section of the microphone assembly is attached to a hot shoe as one of camera shoes in the above embodiment, the camera shoe attachment section may be attached to an accessory shoe in which no electrical connection is made.

Further, it is also possible to record only the sound without recording the moving image by using the microphone assembly. In this case, only the recorded sound data is stored in the memory card in the digital camera or the recording medium of the external recording device.

Various changes and modifications are possible in the present invention and may be understood to be within the present invention.

The invention claimed is:

1. A camera shoe extension comprising:
a support arm having a first end and a second end, an outer circumferential portion of the support arm being formed into a concave shape;
a camera shoe attachment section formed on a lower surface of said first end of said support arm, said camera shoe attachment section being detachably attached to a camera shoe of a digital camera; and
a shoe formed on an upper surface of said second end of said support arm, said shoe holding an accessory such that said accessory is detachable from said shoe,
wherein said support arm is curved into a circular arc shape such that said first and second ends are spaced from each other in a horizontal direction and said second end is located higher than said first end,
wherein said support arm is attached to said camera shoe so as to extend at least in a lens direction of said digital camera, and
wherein a fitting section having a cutout into which a cord of said accessory is fit is formed integrally on a lateral surface of said support arm.

2. The camera shoe extension as defined in claim 1, wherein said camera shoe attachment section comprises:
a leg portion configured to be inserted into said camera shoe; and
a clamp ring configured to clamp said camera shoe between said clamp ring and said leg portion.

3. The camera shoe extension as defined in claim 1, wherein said support arm comprises:
a first arm on which said camera shoe attachment section is formed; and
a second arm on which said shoe is formed, said second arm being slidably attached to said first arm.

4. The camera shoe extension as defined in claim 1, wherein said camera shoe attachment section is rotatably attached to said support arm.

5. The camera shoe extension as defined in claim 1, wherein said camera shoe attachment section comprises:
a leg portion configured to be inserted into said camera shoe; and
a clamp ring configured to clamp said camera shoe between said clamp ring and said leg portion.

6. The camera shoe extension as defined in claim 5, wherein said support arm comprises:
a first arm on which said leg portion and said clamp ring are formed; and
a second arm on which said shoe is formed, said second arm being slidably attached to said first arm.

7. The camera shoe extension as defined in claim 6, wherein said leg portion and said clamp ring are rotatably attached to said support arm.

8. The camera shoe extension as defined in claim 1, wherein the fitting section includes a projection having the cutout.

9. The camera shoe extension as defined in claim 1, wherein an inside portion of the support arm includes a plurality of ribs.

10. The camera shoe extension as defined in claim 9, wherein the ribs are continuous with the outer circumferential portion.

* * * * *